J E. SHERIFF.
POWER TRANSMITTING AND CONTROL MECHANISM.
APPLICATION FILED MAY 27, 1916.

1,316,599.

Patented Sept. 23, 1919.
3 SHEETS—SHEET 1.

UNITED STATES PATENT OFFICE.

J ED SHERIFF, OF NEW YORK, N. Y.

POWER TRANSMITTING AND CONTROL MECHANISM.

1,316,599.     Specification of Letters Patent.   Patented Sept. 23, 1919.

Application filed May 27, 1916. Serial No. 100,323.

*To all whom it may concern:*

Be it known that I, J ED SHERIFF, a citizen of the United States, residing at New York, in the county and State of New York, have made a certain new and useful Invention in Power Transmitting and Control Mechanism, of which the following is a specification.

This invention relates to power transmitting and control mechanism.

The object of the invention is to provide novel and improved means which are simple and efficient to effect and control the transmission of power from a prime mover or driving mechanism to a driven part.

A further object is to effect the control and transmission of power in such manner as to permit the speed and power developed in the driven part to be varied without varying the power or speed of the prime mover or driving mechanism.

A further object is to effect a variation in the speed and power absorbed in the driven part gradually evenly and smoothly and free from recurring impulse effects.

A further object is to employ a turbine mechanism to effect the transmission of power from a prime mover to a part to be driven.

A further object is to secure a control of turbine operating devices for power transmission which will enable any desired variation in the power transmitted or speed to be developed, or direction of operation of the driven part without varying the speed or direction of the prime mover.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Referring to the accompanying drawings and to the various views and reference signs appearing thereon:—

The same part is designated by the same reference numeral wherever it occurs throughout the several views.

In effecting the transmission of power from a prime mover or driving mechanism to a driven part it is exceedingly desirable to provide means to efficiently control the transmission in such manner as to secure variations in the power transmitted as well as in the speed and direction of operation of the part to be driven without varying the speed of the prime mover or its direction of operation. It is also desirable to effect the transition from one power or speed to another, in the driven part, with smoothness and without shock or interruption attendant upon impulse action and to effect a change from one direction of operation to another without varying the speed or direction of the prime motor. Experience has demonstrated that economy and efficiency of operation are secured to the greatest extent in power mechanism, if the prime mover or motor is operated in constant direction and at constant speed. The greatest strains on motors are imposed by repeatedly stopping, starting and reversing them, and changing from one speed or load to another. The shocks resulting from such operations rapidly wear out the motors besides transmitting the shocks and strains to the connections through which the motors are engaged with the part to be driven, and even to the driven part. While this defect is present in all classes of power and transmitting mechanisms it is particularly objectionable in the case of automobile motor trucks, motor boats, aeroplanes, and the like, employing modern high speed high power motor engines. For instance, in the case of pleasure cars the transition from one speed to another develops a shock throughout the entire motor mechanism, transmission and car which is distinctly and frequently disagreeably felt by occupants of the car.

Various designs of transmission mechanism have been proposed to overcome these objections, including electro-magnetic as well as other forms of devices, but so far the problem has not been solved with entirely satisfactory results. For the most part the efforts along this direction have proved unsatisfactory because of the complication and delicate nature of the mechanism proposed, which quickly get out of order, which are difficult to control and expensive to construct and maintain. In the case of the magnetic arrangements proposed difficult and complicated wiring and electrical problems are encountered and expensive constructions combined with great weight are required.

It is among the special objects and purposes of my present invention to provide a transmission mechanism of the nature referred to which is simple and inexpensive in construction, which is easily and readily controllable to effect a transition from maximum speed in one direction to maximum speed in the other direction, or through any desired intermediate range, smoothly and evenly without shock or jar and without varying the speed or direction of the prime motor.

In carrying out my invention I propose to utilize a turbine arrangement so designed as to operate on the tangential rather than the axial principle, and to employ for the operating medium a suitable stable and constant liquid, such for example as mercury. I propose to employ the prime motor to drive an accelerator by which the mercury or other medium is initially accelerated and delivered into the turbine system. While I will hereinafter refer to the operating medium as mercury it is to be understood that in using this term I do not intend to limit or restrict my invention as any other suitable medium may be employed. Mercury, however, will well and efficiently answer my purpose. By employing a turbine system which operates through tangential rather than axial action, the operating medium does not need to fill the turbine system and consequently only a small volume of operating medium is required. For example, a 60 H. P. automobile motor would require to employ only about three pounds of mercury in the turbine system. This means that a minimum of power is absorbed in moving the operating medium and consequently a maximum of the power of the prime motor is available for effective work in driving the driven part. I also propose to employ means for returning the operating medium into the turbine system as rapidly as such medium loses its driving power thus eliminating power losses due to carrying the operating medium after its driving power has been absorbed in the system.

Other special features of importance are incorporated into my construction which I will more particularly point out hereinafter.

Referring to the drawings reference numeral 20 designates the crank case and 21 the driving shaft of any suitable prime motor or engine, not shown, and which, if desired, may be driven at constant speed so far as the operation of the transmitting mechanism of my invention is concerned although, as will be readily understood, said prime motor if desired, may be varied in speed in the usual and ordinary manner. The shaft 21, carries or has connected thereto a fly wheel 22, which, in this instance, is shown in the form of a cylindrical cup the open end of which is closed by a reversely presenting cylindrical cup shaped member 23, which is screwed into it. At the forward end of cup member 23, is disposed a ring member 24, the whole constituting a housing within which is arranged a reversible turbine including "go ahead" and the "back up" turbine mechanism, presently to be described. The shaft to be driven, as, for example, the tail shaft of an automobile drive gearing, is indicated at 25. This shaft is axially bored for a portion of its length to receive a longitudinally movable rod 26, therein. At its forward end rod 26 is connected by links 27, to pistons 28, which operate radially in cylinders 29, formed by and between the walls of fly wheel members 22, and 24. The function of these pistons is to control the volume of operating medium supplied to the turbine system, this function being accomplished through the radial displacement of the pistons effected by the links 27, by shifting the control rod 26, longitudinally, thereby varying the space or area 30 into which collects the operating medium not required for the operation of the turbine mechanism. Increasing the area of this storage space 30, by moving the pistons 28 inwardly the less will be the amount of operating medium supplied to the turbine system, and decreasing the area of the space 30 by moving the pistons outwardly the greater will be the amount of operating medium supplied to the turbine system. The surplus of operating medium reaches the storage space 30 from the turbine system and is again restored from such space into the turbine system when required, through openings 45, which communicate between the space 30 and a space or annular chamber 31 in which operate the pick up buckets of the "go ahead" turbines presently to be described.

Housed within the fly wheel members are the reversible turbines. In practice I employ two sets of turbine elements, one set designed to transmit power from the prime motor, or the shaft 21, thereof to the tail shaft 25 or other part to be driven to actuate the same in one direction and the other set designed to transmit power to the driven part to actuate it in the other direction. One of these sets I will call the "go ahead" turbine elements and the other the "back up" turbine elements. Each set of turbine elements may consist of as many turbine acting elements as may be desired. In the particular form illustrated as one embodiment of my invention, but to which I do not desire to be limited or restricted, I have shown two "go ahead" turbine elements 32, and two "back up" elements 33. These elements are arranged in alternating relation, and delivering into each other in successive order. Each turbine element consists of two concentrically disposed members 34, 35, in the opposed or meeting surfaces of which are formed circumferentially extending channels or grooves 36. These channels terminate at their delivery ends in curved wall portions 37, see Figs. 17, 18, and 19, which reverse the direction of flow of the operating medium in successive turbine elements, the channels successively delivering into each other from one element or another, through lateral circumferentially extending openings 38, see Fig. 17. The buckets 39 of the initial turbine element of the systems deliver through the lateral peripherally extending openings 38 into the channels 36 of the next succeeding turbine element. The curved wall portions 37 at the ends of the channels 36, of course, constitute the turbine buckets of the various succeeding turbine elements. In practice any desired number of buckets 39 and channels 36, and bucket portions 37 may be provided in the turbine element. In the particular arrangement illustrated, to which, however, I am not to be limited or restricted, three pick up buckets 39, are employed and a corresponding number of channels 36, and buckets 37, are provided in each successive turbine element.

The several "go ahead" turbine elements 32 are secured in any convenient manner as for instance, by the bolts 40, to the cylindrical shell portion 41 of a spider 42 having an extended tubular hub 43, which is sleeved over and rotates upon the forward end of the shaft 25 to be driven. The piston control rod 26 extends freely through this hub 43. In like manner the several "back up" turbine elements 33 are secured by bolts 44 to the cylindrical shell portion 46 of a spider 47 having an extended tubular hub 48 which is sleeved upon and journaled to rotatate on the extended hub 43 of the "go ahead" turbine spider carrier, ball or other anti-friction bearings 49, if desired, being interposed between said hub sleeves. The shells 41, 46, extend in opposite directions from their respective carrier spiders 42, 47, the one inside the other, and the turbine elements 32, 33 are disposed in the space between said shells, thus producing a very compact wholly inclosed structure of small size, these being considerations of great importance particularly in the case of automobiles where the space available for power transmitting mechanism is greatly limited.

Figures 9, 10, 11, 12, 14, 15, 16:
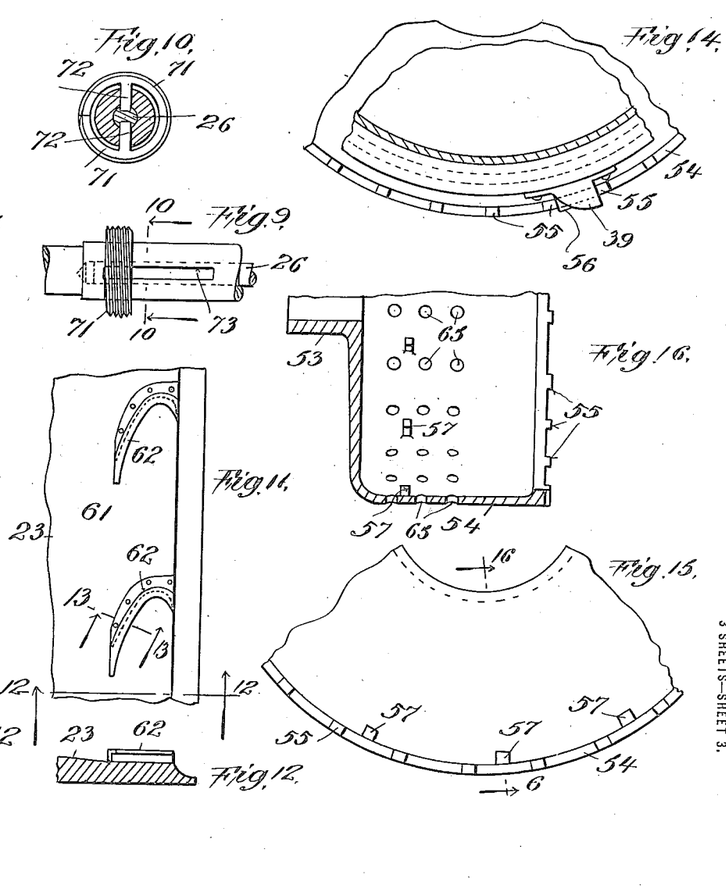
Fig. 9 is a detached broken detail view showing the shifter ring forming a part of the mechanism through which the volume of operating medium supplied to the turbine is controlled.
Fig. 10 is a view in section on the line 10, 10, Fig. 9.
Fig. 11 is a broken fragmentary view showing the accelerating blades on the inner wall of the fly wheel by which the operating medium is accelerated and returned to the turbine system.
Fig. 14 is a broken fragmentary view showing the engagement of the clutch sleeve and pick up member of the turbine system.
Fig. 15 is a detached broken view in front end elevation of the clutch sleeve.
Fig. 16 is a view in section on the line 16, 16, Fig. 15, looking in the direction of the arrows.

The fly wheel and turbine structures above described are inclosed within an outer stationary casing 50. A supporting or bearing sleeve 51 is suitably carried by the casing 50, as, for example, by means of the securing bolts 52, which sleeve telescopes over the tubular hub 48, a ball or other anti-friction bearing 53, being interposed, if desired, between the sleeve 51 and hub 48. Telescoped over the stationary supporting sleeve 51 for longitudinal movement thereon, is the cylindrical hub portion 53ᵃ of a clutch member, the forward portion of which is formed into an enlarged cylindrical shell 54, see Figs. 14 and 15 and 16, which in the illustrative arrangement shown, extends into the space between the fly wheel member 23, and the shell 46 which carries the "back up" turbine elements. This clutch member 54 is provided with clutch teeth 55 formed on and extending from the forward edge thereof, with which engage backing portions 56, formed on the pick up buckets 39 of the initial "go ahead" turbine element 32, when the clutch member 54 is shifted forwardly to the limit of its movements. The clutch member also is provided with lugs 57, on its inner surface which coöperate with corresponding lugs 58, formed on the exterior surface of the shell 46, of the "back up" turbine carrier, thus constituting a clutch arrangement for coupling and uncoupling the "back up" carrier and clutch member 54. The arrangement is such that when the clutch member 54 is shifted forwardly from a mid or neutral position into position for the teeth 55 to engage the pick up bucket backings 56, the lugs 57 and 58 are disengaged from each other, and when shifted rearwardly from the mid or neutral position into position for the lugs 57 and 58 to engage the teeth 55—56 are disengaged from each other. In the mid or neutral position of the clutch member both sets of clutch teeth are out of engagement and both turbine sets are free.

Figures 8, 13:
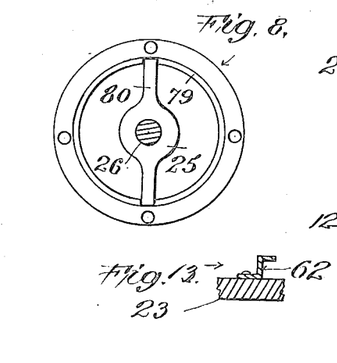
Fig. 8 is a similar view on the line 8, 8, Fig. 1, looking in the direction of the arrows.
Figs. 12 and 13, are broken detail sectional views on the lines 12, 12, and 13, 13, respectively, of Fig. 11.

After the operating medium has passed successively through the various sets of turbine elements it gravitates through the perforations 59, 60, in the shells 46 and 54, onto the inner surface 61 of the fly wheel member 23, at the lowest point thereof. This surface 61 is inclined toward the forward edge thereof, and located upon said surface adjacent said forward edge are the accelerator blades 62, see Figs. 11, 12, and 13. These blades carried by the rotating fly wheel member 23, move at the speed of the prime motor. They are curved in the direction of their length and of their travel and act to scoop up the comparatively quiescent operating medium and project it against the pick up buckets 39 of the initial element of the "go ahead" turbine, thereby returning the operating medium to the turbine system with renewed energy. The velocity at which the operating medium is thus projected against the pick up buckets 39 by the accelerating blades or buckets 62, is dependent upon the speed of the prime motor, the diameter of the accelerating fly wheel member 23, and the degree of curvature of the blades or buckets 62. Ordinarily with the buckets 62 traveling at a peripheral speed of one mile per minute and with a bucket curvature of, say 180°, then the operating medium will be discharged from said buckets against the buckets 39 at a velocity of two miles per minute. The full power of the prime motor is absorbed and utilized in the action of the accelerator buckets or blades 62, when such action results in the delivery of a sufficient volume of the operating medium at the required velocity. The volume of operating medium available for action, and consequently the amount of power transmitted is controlled by the pistons 28, in the manner above described. By employing means to control the radial position of the pistons in such manner as to retain said pistons in any desired position without resorting to ratchet or step by step action, thereby varying the volume of the operating medium supplied to the turbines from nothing to maximum, the same range of power transmitted is secured and the change from one power to another is effected smoothly and evenly and without shock or jar.

The operating medium is projected from the channel or buckets of one turbine element into those of the succeeding turbine element at a speed dependent upon the amount of energy carried in the operating medium at the point of discharge and this is dependent, as above explained, upon the relative circumferential speed of the buckets of the turbine element from which the operating medium has just passed, and the velocity of the operating medium.

In other words, with the tail shaft operating at full speed and where the operating medium enters the initial or pick up turbine element which has a circumferential velocity of one half of that of the medium entering it, such medium will leave this turbine element at substantially zero speed and will then return to the accelerating system without passing on through the turbine system. With the tail shaft running at less than full speed the operating medium will, in this case, leave the initial pick up turbine element, and will be projected into the next adjacent turbine element at a speed inversely proportional to the velocity of the pick up element. This same rule applies throughout the entire turbine system. The higher the speed at which the driven member 25, is driven the fewer will be the number of active turbine elements employed and vice versa. Therefore, within the range of speed and power transmission effected there may be times where the operating medium reaches a point while passing through the turbine system when it is no longer doing any effective transmitting work. This condition is reached when the velocity of the operating medium decreases to that of the speed of the bucket ring member of the turbine element carrying it. When this condition is reached power which might be otherwise available for accomplishing effective work would be absorbed in carrying the dead load of the operating medium on through the turbine system before being returned or restored again to active kinetic condition by the accelerator. This means loss of efficiency. To overcome this difficulty and to attain the highest degree of efficiency I provide means to return the operating medium to the accelerator immediately as soon as its energy has been absorbed in the turbine system. This result may be attained in many specifically different ways within the broad and generic scope of my invention. I have shown a simple and effective construction, as illustrative of the principles involved, wherein drain holes 63 are drilled through the outer ring members 34 of the turbine elements from the channels 36 therein. In practice I prefer to incline these drain holes rearwardly with reference to the direction of flow of the operating medium, from the channels 36, to the outer surface of the ring members. If the operating medium flows along a channel at a greater velocity than the speed of the bucket carrying member of the associated turbine element then there is no tendency for such medium to escape through the holes 63. If, however, the velocity of the operating medium has decreased by absorption in the system of all its kinetic energy until it is the same as that of its turbine element carrying member, then the medum escapes from the channel 36 through the holes 63 therein and through the holes 59 and 60, and finds its way back to the accelerator by which it is again energized and returned into the turbine system. This I regard as an important and valuable feature of my invention.

In order to permit the clutch member 54 to be shifted along the supporting sleeve 51, the bolts 52 which support said sleeve extend through longitudinal slots 64 in the hub 53 of the clutch member.

Figure 7:
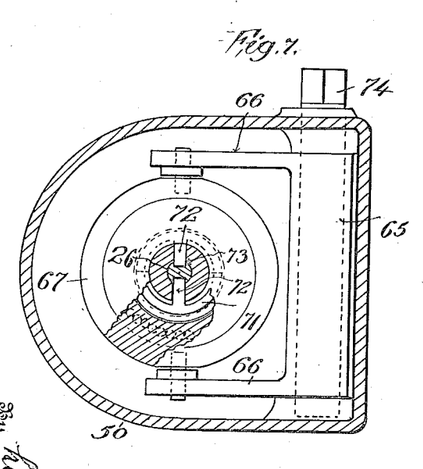
Fig. 7 is a view in transverse section on the line 7, 7, Fig. 1, looking in the direction of the arrows.

The longitudinal adjustment of the control rod 26 may be accomplished in any suitable or desirable manner. I have shown a simple arrangement to exemplify the principles involved, but to which my invention is not to be limited or restricted, wherein a rock shaft 65 is suitably journaled in the casing 50 and is provided with arms 66, which are pivotally connected to a ring 67. This ring is provided with an inwardly extending angular flange 68, which is received between two clamp ring sections 69, 70. These clamp ring sections serve to retain shifter keys in place. Two such keys are shown, see Figs. 7, 9, and 10, each consisting of a circular segmental portion 71, and a central inwardly extending tongue portion 72. The tongues 72 extend through longitudinal slots 73 in shaft 25, and into sockets or seats formed in the rod 26. In the particular form shown the two keys are positioned to encircle the shaft 25 with the tongues 72 thereof presenting toward each other and extending through slots 73 on opposite sides of the shaft 25 and into diametrically opposite seats in the rod 26. The clamp rings 69, 70, retain the keys in place. By suitably rotating the shaft 65, the shifter ring 67 is moved in the direction of length of the shaft 25, the tongues 72 moving in the slots 73, thereby shifting the rod 26 endwise and consequently adjusting the radial displacement of the pistons 28. The actuation of shaft 65 may be effected through any desired lever or other connection applied to the shaft 65, or to the extended end 74, thereof.

Figures 1, 17, 18, 19:
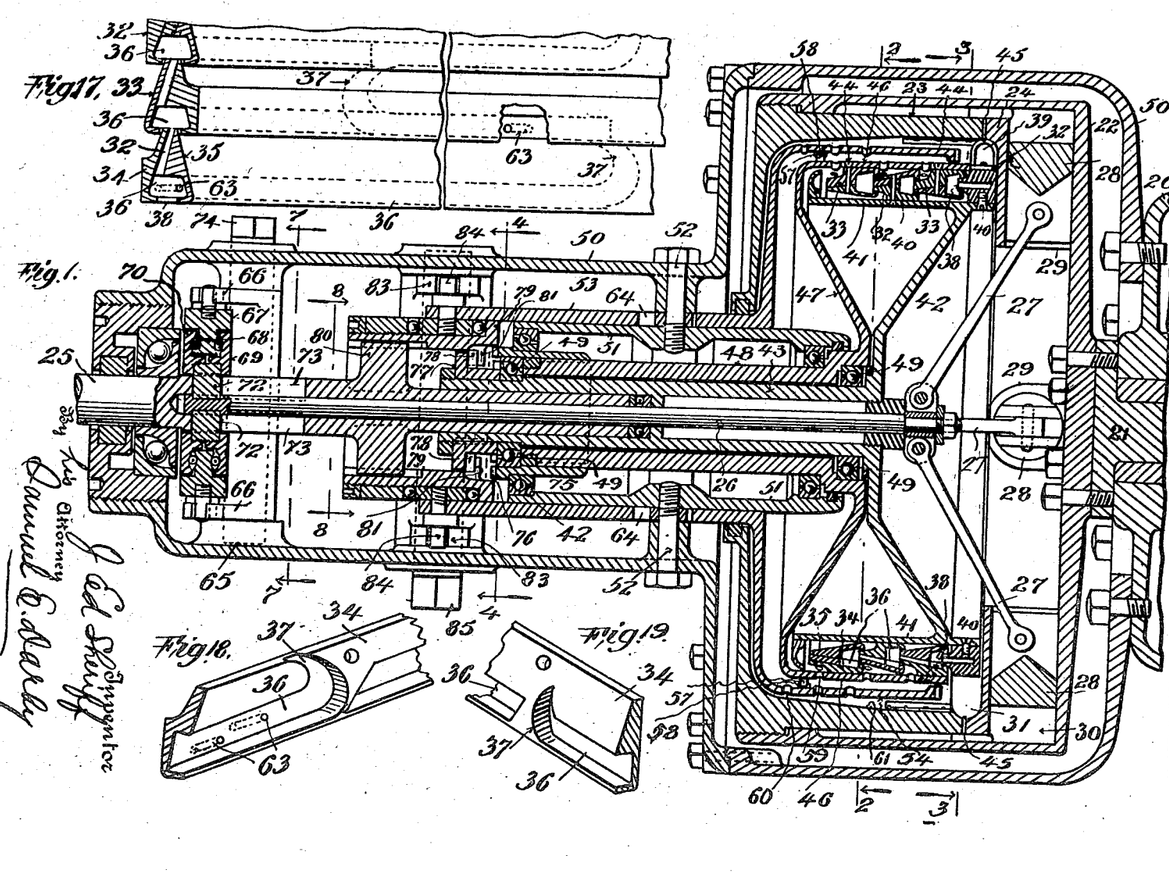
Figure 1 is a view in central longitudinal section, parts broken off, showing a construction of power transmitting and control mechanism embodying the principles of my invention.
Fig. 17 is a broken view, parts in section, illustrating the structure, relation and operation of adjacent turbine elements.
Figs. 18 and 19 are detached broken detail views in perspective illustrating the channel arrangement in the outer member of the turbine elements through which the operating medium passes in the operation of the mechanism.
Figures 2, 3, 4, 5, 6:
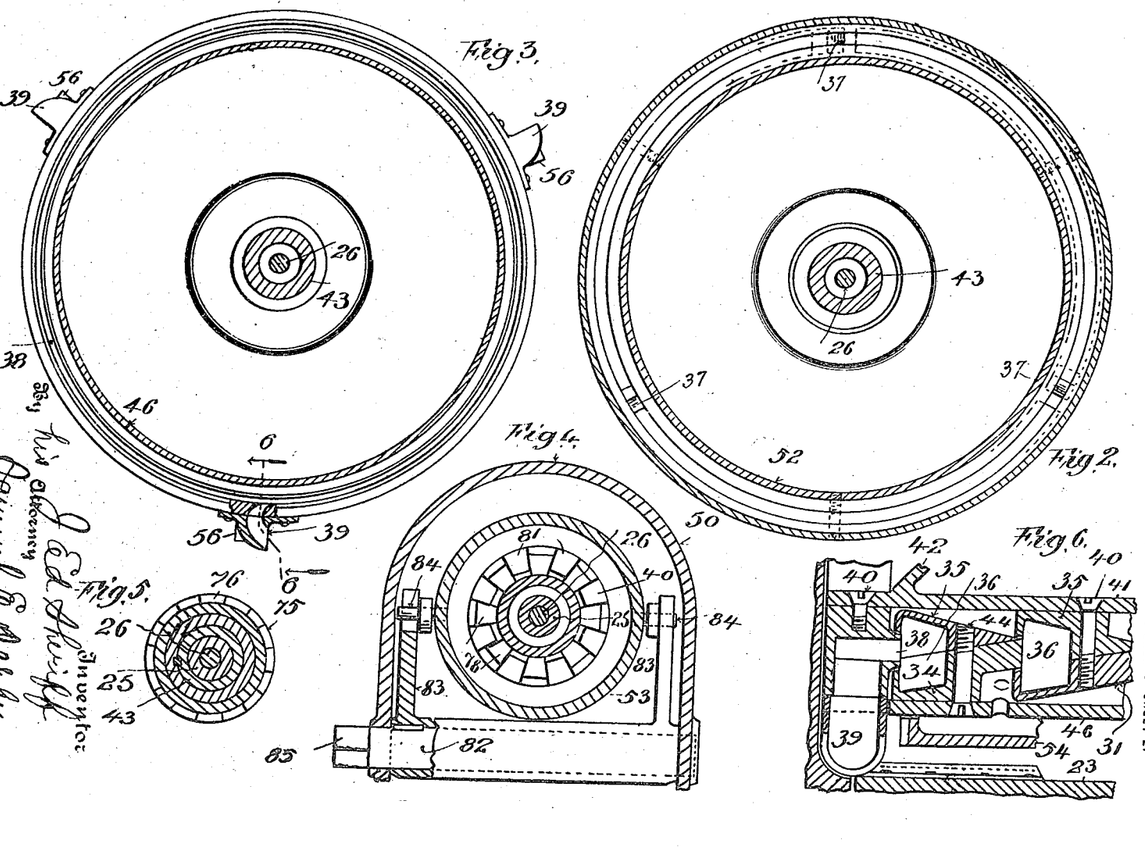
Fig. 2 is a view in section on the line 2, 2, Fig. 1, looking in the direction of the arrows, the fly wheel and its inclosing case being removed.
Fig. 3 is a similar view in section on the line 3, 3, Fig. 1, looking in the direction of the arrows.
Fig. 4 is a view in section on the line 4, 4, Fig. 1, looking in the direction of the arrows.
Fig. 5 is a similar view on the same plane as Fig. 4, but looking in the opposite direction the casing fly wheel hub and carrying sleeve being omitted.
Fig. 6 is a broken detail view in section on the line 6, 6, Fig. 3, looking in the direction of the arrows.

I will now describe the reversing clutch mechanism through which the "go ahead" and "back up" turbine elements are respectively connected to the shaft 25, or other part to be driven to drive the same in reverse directions, particular reference being had to Figs. 1, 4, and 5.

Suitably keyed to rotate with the hub 48 of the "back up" turbine is a sleeve 75, having rearwardly presenting clutch teeth 76. Keyed to rotate with the hub 43 of the "go ahead" turbine is a sleeve 77 having forwardly presenting clutch teeth 78. A clutch sleeve 79 is keyed to a spider 80 of shaft 25 to rotate therewith but is adapted for longitudinal movement relatively thereto. This sleeve 79 is provided with clutch teeth 81 on its forward end which work back and forth between the clutch teeth 76, 78 of sleeves 75, 77. That is to say when the clutch sleeve 79 is shifted toward the right as viewed in Fig. 1, to the limit of its movement the teeth 81 engage with teeth 76, and when shifted toward the left to its limit of movement, this being the position of the parts shown, the teeth 81 engage teeth 78. In an intermediate mid or neutral position the teeth 81 are disengaged from both sets of teeth 76, 78. The clutch sleeve 79 is rigidly connected to move with the hub 53ª of the clutch sleeve 54 and the relation of the parts is such that when the teeth 81 and 78 are in engagement so also are the teeth 57, 58, and the teeth 55, 56, are disengaged. This is the position of the parts shown in Fig. 1. This means that the "back up" turbine elements are locked while the "go ahead" turbine elements are free to operate, and when operated power is transmitted to shaft 25 to drive the same in the direction as determined by that of the "go ahead" turbine elements. When, however, the sleeve 53 is shifted to its other limit of movement the teeth 78, 81, are disengaged as are also the teeth 57, 58, while the teeth 81, 76, are in engagement as are also the teeth 55, 56. This means that the "go ahead" turbine elements are locked against operation while the "back up" turbine elements are free to operate, and as they operate in a reverse direction to that of the "go ahead" turbines because of the reverse direction of discharge of the operating medium from one set of turbines to the other, the shaft 25 will now be driven in the reverse direction from that above described. And when the clutch members 53, 54, 79, are in mid or neutral position both turbine sets are free and no rotation will be imparted to shaft 25. Thus the direction of rotation of the shaft to be driven may be reversed without changing any gearing connections by merely shifting the clutch member 53ª. This shifting may be effected in any suitable or convenient manner. A simple arrangement is shown, to which however, I do not desire to be limited or restricted, wherein a rock shaft 82 is journaled in the casing and is provided with arms 83 in which are engaged studs 84, which are connected to the sleeve or hub 53ª. By applying a lever or other suitable connection to the end 85 of shaft 82 the desired reversal may be effected.

From the foregoing description of the turbine structure shown it will be seen that the application of the energy of the projected operating medium is in a tangential rather than an axial application, by reason of which the entire space of the passages in the turbine elements is not required to be filled with operating medium and consequently only a relatively small volume of such medium is necessary.

It will be understood that many variations and changes in the details of construction and arrangement of parts will readily occur to persons skilled in the art and still fall within the spirit and scope of my invention. I do not desire, therefore, to be limited or restricted in the broadest scope of my invention as defined in the claims to the particular structure shown and described.

But having now set forth the objects and nature of my invention, and a construction embodying the principles thereof, what I claim as new and useful and of my own invention, and desire to secure by Letters Patent is—

1. In a power transmission mechanism, a power shaft and a driven shaft, turbine elements mounted independently of said shafts, means actuated by the power shaft for delivering the operating medium to one of said turbine elements to operate the same in one direction, said element delivering the operating medium to the other of said elements to operate it in the opposite direction, means to couple and uncouple said turbine elements, respectively, to and from the driven shaft, and means actuated by the power shaft to return the operating medium into the turbine system at accelerated velocity after the energy thereof has been absorbed by passing through said system.

2. In a power transmission mechanism, a power shaft and a driven shaft, turbine elements mounted independently of said shafts, means actuated by the power shaft to deliver the operating medium tangentially to one of said turbine elements to operate the same in one direction, said element delivering the operating medium tangentially to the other element to operate the same in reverse direction, means to independently couple and uncouple said turbine elements to and from the driven shaft, means to return the operating medium from the turbine system to the action of the delivery means into the system, and means to accelerate the delivery of the operating medium into the turbine system.

3. In a power transmission mechanism, a power shaft and a driven shaft, turbine elements mounted independently of said shafts, means to respectively couple and uncouple said elements to and from the driven shaft, said elements operating in reverse directions relatively to each other, means operated by the power shaft for delivering operating medium tangentially into the turbine system, and means to control the supply of operating medium to the action of said delivery means.

4. A power transmitting mechanism including turbine elements arranged side by side and delivering laterally from one to another in succession, adjacent elements respectively operating in reverse directions, said elements being interposed between the power and the driven parts, and means operated by the power part to deliver the operating medium tangentially to the turbine elements.

5. A power transmitting mechanism including turbine elements arranged side by side and delivering laterally from one to another in succession, adjacent elements respectively operating in reverse directions, said elements being interposed between the power and the driven parts, and means to deliver the turbine operating medium tangentially from one turbine element to the next adjacent one.

6. A power transmitting mechanism including turbine elements arranged side by side and delivering laterally from one to another in succession, adjacent elements respectively operating in reverse directions, said elements being interposed between the power and the driven parts, and means to deliver the turbine operating medium tangentially in reverse directions into succeeding turbine elements.

7. A power transmitting mechanism including turbine elements arranged side by side and delivering laterally from one to another in succession, adjacent elements respectively operating in reverse directions, said elements being interposed between the power and the driven parts, and means operating to couple one of said turbine elements to the driven part and to lock the other.

8. A power transmitting mechanism including relatively reversible turbine elements arranged side by side in axially displaced relation and in successive orders, and means to deliver the turbine operating medium tangentially in respectively opposite directions to adjacent turbine elements.

9. A power transmitting mechanism including relatively reversible turbine elements arranged side by side in axially displaced relation and in successive orders, means to deliver the turbine operating medium tangentially in respectively opposite directions to adjacent turbine elements and means to vary the volume of operating medium delivered to the turbine elements.

10. In a power transmitting mechanism, a stationary carrying sleeve, turbine carriers having extended hubs telescoped the one upon the other and extended through said sleeve, means to lock one of said turbine carriers against rotation while leaving the other free, a power shaft and a driven shaft, means operated by the power shaft to actuate said free turbine carrier, and means to couple the free turbine carrier to the driven shaft.

11. In a power transmitting mechanism, and in combination with a power shaft and a driven shaft, turbines mounted side by side in axially displaced relation for operation in opposite direction, means to restrain one of said turbines against movement while leaving the other free, means actuated by the power shaft for driving the free turbine and means to couple the free turbine to the driven shaft and means for supplying operating medium tangentially to the turbines.

12. In a power transmitting mechanism, and in combination with a power shaft and a driven shaft, turbines mounted side by side in axially displaced relation for operation in opposite directions, means to restrain one of said turbines against movement while leaving the other free, said means also operating to couple the free turbine to the driven shaft, and means actuated by the power shaft for driving the free turbine and means for supplying operating medium tangentially to the turbines.

13. In a power transmitting mechanism, a power shaft and a driven shaft, turbines mounted to operate in opposite directions with respect to each other, a clutch member having means to lock said turbines against movement, means for shifting said member into position to lock one of said turbines and to release the other, means also operating to coincidentally couple the released turbine to the driven shaft, and means operated by the power shaft for driving the released turbine.

14. In a power transmitting mechanism, a power shaft and a driven shaft, turbines mounted to operate in opposite directions with respect to each other, clutch devices operating to lock at will the one or the other of said turbines against rotation, and means to couple the unlocked turbine to the driven shaft.

15. In a power transmitting mechanism, a power shaft and a driven shaft, a rotating member driven by the power shaft and carrying accelerator blades, a turbine mechanism disposed in axially displaced relation to the accelerator blades and operated by medium delivered tangentially thereto by said accelerator blades, and connections intermediate the turbine mechanism and the driven shaft.

16. In a power transmitting mechanism, a power shaft and a driven shaft, a fly wheel structure driven by the power shaft and including a cylindrical member, said member having an outwardly inclined inner surface, a turbine mechanism to which said inclined surface delivers, and driving connections intermediate the turbine mechanism and the driven shaft.

17. In a power transmitting mechanism, a power shaft and a driven shaft, a fly wheel structure driven by the power shaft and including a cylindrical member, said member having an outwardly inclined inner surface, accelerator blades carried by said inclined surface, a turbine mechanism to which said accelerator blades deliver, and driving connections between said turbine mechanism and the driven shaft.

18. In a power transmitting mechanism, a power shaft and a driven shaft, a fly wheel structure driven by the power shaft and including a cylindrical member, said member having an outwardly inclined inner surface, accelerator blades carried by said inclined surface, a turbine mechanism to which said accelerator blades deliver, driving connections between said tubrine mechanism and the driven shaft and means to return the operating medium to the inclined surface of said member from the turbine mechanism.

19. In a power transmitting mechanism, a power shaft and a driven shaft, a fly wheel structure driven by the power shaft and including a cylindrical member, said member having an outwardly inclined inner surface, accelerator blades carried by said inclined surface, a turbine mechanism to which said accelerating blades deliver, driving connections between said turbine mechanism and the driven shaft and means to return the operating medium from the turbine mechanism to the action of said blades.

20. In a power transmitting mechanism, a power shaft and a driven shaft and a turbine mechanism interposed therebetween, said turbine mechanism including channeled members, said members having leak ducts or openings from the channels therein, said ducts or openings delivering to the intake side of said mechanism.

21. In a power transmitting mechanism, a power shaft and a driven shaft and a turbine mechanism interposed therebetween, said turbine mechanism including independent members disposed adjacent each other in successive order and having longitudinally extending annular channels delivering successively into each other in opposite directions.

22. In a power transmitting mechanism, a power shaft and a driven shaft and a turbine mechanism interposed therebetween, said turbine mechanism including independent members disposed side by side in axially displaced relation and adjacent each other in successive order, and having channels therein respectively extending in reverse directions and means for supplying operating medium tangentially to said members.

23. In a power transmitting mechanism, a power shaft and a driven shaft and a turbine mechanism interposed therebetween, said turbine mechanism including members arranged successively adjacent each other and each having annular channels for the flow of the operating medium, the channels of each member delivering in reverse direction into the channels of the next adjacent member.

24. In a power transmitting mechanism, a power shaft and a driven shaft and a turbine mechanism interposed therebetween, said turbine mechanism including members arranged successively adjacent each other and each having annular channels for the flow of the operating medium, and openings arranged through said members to deliver from the channels therein directly to the intake side of said turbine mechanism.

25. In a power transmitting mechanism, a power shaft and a driven shaft and a turbine mechanism interposed therebetween, said turbine mechanism including members arranged successively adjacent each other and each having annular channels for the flow of the operating medium, and openings arranged through said members to deliver from the channels therein directly to the intake side of said turbine mechanism, said openings being inclined rearwardly with reference to the direction of flow of the operating medium through said channels.

26. In a power transmitting mechanism, a power shaft and a driven shaft, and speed and direction controlling mechanism interposed between said shafts, said mechanism including turbines arranged side by side and in axially displaced relation to operate in reverse directions with reference to each other, the power shaft operating to deliver the operating medium tangentially into the intake side of the turbine system and means to accelerate the operating medium in its delivery into the turbine system.

27. In a power transmitting mechanism, a power shaft and a driven shaft, and speed and direction controlling mechanism interposed between said shafts, said mechanism including turbines arranged side by side in axially displaced relation to operate in reverse directions with reference to each other, means operated by the power shaft to deliver the operating medium tangentially to the intake side of the turbine system under acceleration to operate the latter, and means to return the medium to the accelerating action of the said power shaft operated means as soon as its propelling power is absorbed in the turbine system.

28. In a power transmitting mechanism, a power shaft and a driven shaft, and speed and direction controlling mechanism interposed between said shafts, said mechanism including turbine carriers having portions arranged to extend one inside the other to form a space therebetween, turbine elements disposed in said space and respectively secured to said carrier portions in alternative relation, said turbine elements delivering in reverse direction the one into the next adjacent one, means actuated by the power shaft to deliver the operating medium into the intake side of the turbine system and means to connect either of said turbine carriers to the driven shaft.

29. In a power transmitting mechanism, a power shaft and a driven shaft, and speed and direction controlling mechanism interposed between said shafts, said mechanism including turbine carriers having portions arranged to extend one inside the other to form a space therebetween, turbine elements disposed in said space and respectively secured in said carrier portions in alternative relation, said turbine elements delivering in reverse direction the one into the next adjacent one, means actuated by the power shaft to deliver the operating medium into the intake side of the turbine system, a clutch member to lock, at will, either one or the other of the turbine carriers, and means to couple the unlocked turbine carrier to the shaft to be driven.

30. In a power transmitting mechanism, a power shaft and a driven shaft, and speed and direction controlling mechanism interposed between said shafts, said mechanism including turbine carriers having portions arranged to extend one inside the other to form a space therebetween, turbine elements disposed in said space and respectively secured to said carrier portions in alternative relation, said turbine elements delivering in reverse directions the one into the next adjacent one, means actuated by the power shaft to deliver the operating medium into the intake side of the turbine system, a clutch member having a portion to inclose said carrier portions, said inclosing clutch member portion having means to lock either of said carriers, and means to coincidently couple the unlocked turbine carrier to the shaft to be driven.

31. In a power transmitting mechanism, a power shaft and a driven shaft, and speed and direction controlling mechanism interposed between said shafts, said mechanism including turbine carriers having portions arranged to extend one inside the other to form a space therebetween, turbine elements disposed in said space and respectively secured to said carrier portions in alternative relation, said turbine elements delivering in reverse direction the one into the next adjacent one, means actuated by the power shaft to deliver the operating medium into the intake side of the turbine system the outer one of said carrier portions having openings therethrough to permit the operating medium to escape from the turbine system back to the said delivery means, and means to couple the one or the other of said turbine carriers to the shaft to be driven.

32. In a power transmitting mechanism, a power shaft and a driven shaft, and speed and direction controlling mechanism interposed between said shafts, said mechanism including turbine carriers having portions arranged to extend one inside the other to form a space therebetween, turbine elements disposed in said space and respectively secured to said carrier portions in alternative relation said turbine elements delivering in reverse direction the one into the next adjacent one, means actuated by the power shaft to deliver the operating medium into the intake side of the turbine system the outer one of said carrier portions having openings therethrough to permit the operating medium to escape from the turbine system back to the said delivery means, means to adjustably control the volume of operating medium delivered to the turbine system, and means to couple either of said turbine carriers to said driven shaft.

33. In a power transmitting mechanism, a power shaft and a driven shaft, and speed and direction controlling mechanism interposed between said shafts, said mechanism including turbine carriers having portions arranged to extend one inside the other to form a space therebetween, turbine elements disposed in said space and respectively secured to said carrier portions in alternative relation, said turbine elements delivering in reverse direction the one into the next adjacent one, a rotary member driven by the power shaft and inclosing said carrier portions, and having means to deliver the operating medium into the intake side of the turbine system, and means to couple either of said turbine carriers to the driven shaft.

34. In a power transmitting mechanism, a power shaft and a driven shaft, and a turbine system interposed between said shafts, said turbine system including carriers each having an extended hub, said hubs sleeved the one inside the other and having juxtaposed clutch teeth, a clutch member operating between said juxtaposed teeth to engage either set at will, connections between said clutch member and the driven shaft, and means operated by the power shaft for rotating either of said turbine carriers but in reverse direction with relation to each other.

35. In a power transmitting mechanism, a power shaft and a driven shaft, and a turbine system interposed between said shafts, said turbine system including carriers each having an extended hub, said hubs sleeved the one inside the other and having juxtaposed clutch teeth, a clutch member operating between said juxtaposed teeth to engage either set at will, connections between said clutch member and the driven shaft, a supporting sleeve within which said hubs are journaled, and means operated by the power shaft for rotating either of said turbine carriers but in respectively opposite directions.

36. In a power transmitting mechanism, a power shaft and a driven shaft, and a turbine system interposed between said shafts, said turbine system including carriers each having an extended hub, said hubs sleeved the one inside the other and having juxtaposed clutch teeth, a clutch member operating between said juxtaposed teeth to engage either set at will, connections between said clutch member and the driven shaft, a clutch sleeve connected to move with said clutch member and having means to lock one or the other of said turbine carriers against rotation according to which one is clutched to the driven shaft, and means operated by the power shaft for rotating the unlocked carrier.

37. In a power transmitting mechanism, a power shaft and a driven shaft, and a turbine system interposed between said shafts, said turbine system including a casing, a bearing sleeve stationarily mounted in said casing, turbine carriers mounted to revolve in respectively opposite directions, and having hubs telescoped the one inside the other, the outer hub being journaled in said sleeve, a clutch member mounted to slide on said sleeve, and carrying means to clutch either of said hubs to the driven shaft, means also carried by said sleeve to coincidently lock the uncoupled turbine carrier against rotation, and means operated by the power shaft to deliver the operating medium to the turbine system.

38. In a power transmitting system, a power shaft and a driven shaft, said driven shaft having a longitudinal bore, a rod mounted to slide in said bore, a turbine system including reversely rotatable turbine carriers, means to couple either of said carriers, at will, to the driven shaft and to coincidently lock the other against rotation, means actuated by the power shaft to deliver the operating medium to the turbine system, means operated by the said rod when shifted to vary the volume of operating medium delivered to the turbine system, and means to shift said rod.

In testimony whereof I have hereunto set my hand on this 22nd day of May A. D., 1916.

J ED SHERIFF.